(12) United States Patent
Levin et al.

(10) Patent No.: US 11,767,248 B2
(45) Date of Patent: Sep. 26, 2023

(54) PROCESS AND APPARATUS FOR THE TREATMENT OF ORGANIC FEEDSTOCK

(71) Applicant: S.G.T.—SUSTAINABLE GREEN TECHNOLOGIES LTD, Netanya (IL)

(72) Inventors: Gal Levin, Netanya (IL); Reuven Eitan, Giv'at Shmuel (IL)

(73) Assignee: S.G.T.—SUSTAINABLE GREEN TECHNOLOGIES LTD, Netanya (IL)

( * ) Notice: Subject to any disclaimer, the term of this patent is extended or adjusted under 35 U.S.C. 154(b) by 75 days.

(21) Appl. No.: 17/273,850

(22) PCT Filed: Sep. 15, 2019

(86) PCT No.: PCT/IL2019/051029
§ 371 (c)(1),
(2) Date: Mar. 5, 2021

(87) PCT Pub. No.: WO2020/058971
PCT Pub. Date: Mar. 26, 2020

(65) Prior Publication Data
US 2021/0206681 A1    Jul. 8, 2021

(30) Foreign Application Priority Data

Sep. 17, 2018 (IL) .......................................... 261837

(51) Int. Cl.
*C02F 11/04*    (2006.01)
*C02F 3/00*    (2023.01)
(Continued)

(52) U.S. Cl.
CPC .............. *C02F 11/04* (2013.01); *C02F 3/006* (2013.01); *C02F 3/1263* (2013.01); *C02F 3/282* (2013.01);
(Continued)

(58) Field of Classification Search
CPC ............ C02F 11/04; C02F 3/006; C02F 3/28; C02F 3/302; C02F 2103/20; C02F 3/1221; C02F 3/1263; C02F 11/12
(Continued)

(56) References Cited

U.S. PATENT DOCUMENTS

| 4,919,815 A | 4/1990 | Copa et al. |
| 5,792,355 A | 8/1998 | Desjardins |

(Continued)

FOREIGN PATENT DOCUMENTS

| CN | 1548390 A | 11/2004 |
| CN | 1622921 A | 6/2005 |

(Continued)

OTHER PUBLICATIONS

PCT International Search Report and Written Opinion for International Application No. PCT/IL2019/051029, dated Dec. 19, 2019, 12 pages.

(Continued)

*Primary Examiner* — Claire A Norris
(74) *Attorney, Agent, or Firm* — Hoffman Warnick LLC (57) ABSTRACT

A system for treating organic feedstock, particularly livestock or poultry wastewater. The system employs combined anaerobic and aerobic digestion for converting the wastewater into safe water, fertilizer, and energy, wherein sequencing batch reactors (i.e. ASBR and SBR) are used for the digestion process.

13 Claims, 5 Drawing Sheets

(51) Int. Cl.
　　　*C02F 3/12* (2023.01)
　　　*C02F 3/28* (2023.01)
　　　*C02F 11/12* (2019.01)
　　　*C02F 103/20* (2006.01)
　　　*C02F 103/32* (2006.01)

(52) U.S. Cl.
　　　CPC .......... *C02F 11/12* (2013.01); *C02F 2103/20* (2013.01); *C02F 2103/327* (2013.01); *C02F 2209/02* (2013.01); *C02F 2209/40* (2013.01); *C02F 2301/046* (2013.01); *C02F 2301/08* (2013.01)

(58) Field of Classification Search
　　　USPC .................................. 210/605, 195.1, 195.3
　　　See application file for complete search history.

(56) References Cited

U.S. PATENT DOCUMENTS

| | | | |
|---|---|---|---|
| 6,126,827 | A | 10/2000 | Johnson, Jr. et al. |
| 6,190,554 | B1 | 2/2001 | Mandt |
| 6,398,957 | B1 | 6/2002 | Mandt |
| 6,444,124 | B1 | 9/2002 | Onyeche et al. |
| 6,676,836 | B2 | 1/2004 | Mandt |
| 7,163,629 | B2 | 1/2007 | Abu-Orf et al. |
| 2002/0074287 | A1 | 6/2002 | Park et al. |
| 2002/0079266 | A1 | 6/2002 | Ainsworth et al. |
| 2002/0185448 | A1 | 12/2002 | Chisholm et al. |
| 2005/0035059 | A1 | 2/2005 | Zhang et al. |
| 2005/0087480 | A1 | 4/2005 | Park et al. |
| 2005/0189295 | A1 | 9/2005 | Barnard |
| 2011/0089105 | A1 | 4/2011 | Liu et al. |
| 2011/0203992 | A1 | 8/2011 | Liu et al. |
| 2012/0006745 | A1 | 1/2012 | Kaley et al. |
| 2018/0186672 | A1 | 7/2018 | Levin |

FOREIGN PATENT DOCUMENTS

| | | | |
|---|---|---|---|
| CN | 101602541 | A | 12/2009 |
| CN | 101723538 | A * | 6/2010 |
| CN | 102060413 | A | 5/2011 |
| CN | 102583931 | A | 7/2012 |
| CN | 102583933 | A | 7/2012 |
| CN | 204369650 | U | 6/2015 |
| CN | 105668946 | A | 6/2016 |
| CN | 107381812 | A | 11/2017 |
| JP | H1043790 | | 2/1998 |
| JP | 2004290826 | A | 10/2004 |
| KR | 20020087799 | A | 11/2002 |
| KR | 100460942 | B1 | 12/2004 |
| KR | 101338772 | B1 | 12/2013 |
| WO | 2006019256 | A1 | 2/2006 |
| WO | 2011066866 | A1 | 6/2011 |
| WO | 2011106621 | A2 | 9/2011 |
| WO | 2012019310 | A | 2/2012 |
| WO | 2017203505 | A1 | 11/2017 |
| WO | 2017218239 | A1 | 12/2017 |
| WO | WO-2018106986 | A1 * | 6/2018 .......... B01F 13/0222 |

OTHER PUBLICATIONS

Hala El-Kamah et al., "Treatment of high strength wastewater from fruit juice industry using integrated anaerobic/aerobic system," Elsevier, ScienceDirect, Desalination, 253, 2010, pp. 158-163.

European Search Report for Application No. 19863404.0, dated May 4, 2022, 34 pages.

Chinese Office Action for Application No. 201980069012.0, dated Jul. 4, 2022, 21 pages.

Zhang R. et al., "Treatment of Swine Wastewater with biological conversion, filtration, and reverse osmosis: A laboratory study, Transactions of the ASAE", 2004, vol. 47, No. 1, pp. 243-250.

Chan Y. J. et al. "A review on anaerobic-aerobic treatment of industrial and municipal wastewater" Chemical Engineering Journal, vol. 155, No. 1-2, pp. 1-18, Dec. 2009.

Engineering technology examples and supporting technical product equipment, pollution control department of the State Environmental Protection Administration , Figure 1 on p. 52—the penultimate paragraph on p. 53, China Environmental Science Press, May 31, 2004.

Second Chinese Office Action for application No. 201980069012.0, dated Jan. 11, 2023.

* cited by examiner

PROCESS AND APPARATUS FOR THE TREATMENT OF ORGANIC FEEDSTOCK

FIELD OF THE INVENTION

The present invention relates to the treatment of organic feedstock. Particularly, the invention relates to a system for processing waste from farm animals. More particularly, the invention relates to an apparatus and method for converting wastewater originating from livestock or poultry into safe water, soil amendment, and energy.

BACKGROUND OF THE INVENTION

Wastewater discharge from cities and intensive livestock farms constitute the main organic pollutant loads into rivers. With rapid urban population growth expected in the next decades, both sources of organic pollution are expected to increase. Dairy farm wastewater has the potential to cause high levels of environmental pollution and is a significant challenge for Waste Water Treatment Plants (WWTP). The effluents are characterized by high loads of organic matter, suspended solids, nitrogen and phosphorus.

Excess nitrogen and phosphorus in water caused by runoff from livestock farms lead to fast algal growth. The significant increase in algae harms water quality, food resources and habitats, and decreases the oxygen that fish and other aquatic life need to survive. Large growths of algae are called algal blooms, some are harmful to humans because they produce elevated toxins and bacterial growth that can cause illness for those who come into contact with the polluted water, consume tainted fish or shellfish, or drink contaminated water.

Dairy farm waste comes from two main sources: 1) wastewater from the milking parlor and holding areas ("milking wastewater") characterized as a liquid stream, with up to 1% solids, which must undergo pre-treatment before discharge into the public sewage system; and 2) fresh cow manure from the cowshed and feeding area characterized as a solid stream, having 15% solids, which may be spread in fields for cultivation, used as organic bedding or stored and then sent to a regional composting facility, or biogas plant.

Anaerobic digestion (AD) technology for producing electricity from organic waste is well known and has been implemented for decades in Europe. During anaerobic digestion, organic matter is broken down gradually using a complex system of bacteria until biogas is produced. Despite its advantages, this technology is characterized by a major shortcoming, which is the formation of "digestate"—black water (aka—Black Liquor, Percolate or Liquid Organic Fertilizer (LOF)) having very high levels of pathogens, nitrates, sodium and phosphorus. The digestate formed by AD of Livestock waste is especially hazardous, and generally not permitted for discharge into municipal wastewater treatment facilities.

The common solution in Europe for the digestate formed as a byproduct of AD is dispersal of digestate in arable lands due to the high nutrient levels. However, due to concerns of runoff in the rainy seasons, there are restrictions regarding its dispersal. These restrictions require storage of digestate between 4-8 months, a constraint which increases the capital expenditure (CAPEX) and operating expenses (OPEX) of the facility. In addition, in soils with low clay content usually with high CEC (Cation Exchange Capacity), the risk of nutrient leaching is much higher due to the high concentration of sand.

Another constraint, when using digestate as fertilizer or in land reclamation of arable lands, is high salinity with minimal precipitation. High clay soil content with low CEC may lead to a drainage problem and puddle formation, which results in releasing sodium ions to the liquid phase, increasing soil alkalinity, and decreasing the soil fertility.

There are several methods to reduce the volume of digestate, most of which are based on mechanical separation of the solids from the liquid and evaporation of the liquid to reduce volume, but they require the use of additional chemicals and energy, increasing the costs of wastewater treatment while reducing the economic viability.

The present invention addresses the problem of digestate by using a wastewater treatment process for treating organic waste, which results in a water effluent (safe water) at a quality permitted for discharging into the sewage system (at least by sewage discharge levels permitted according to Israeli regulations). The invention enables the removal of a high level of organic matter and suspended solids in wastewater, as well as nitrogen and phosphorus. Moreover, the safe water effluent may be recycled within the apparatus according to the invention for diluting the feedstock.

It is another object of the invention to fulfil the unmet need for low-cost solution for small sized farms. The size of apparatus according to the invention is significantly smaller than the size of conventional facilities and this greatly affects the construction, operation and maintenance costs of the apparatus.

It is a further object of the invention to provide an apparatus and process which do not require the addition of chemicals.

It is yet another object of the invention to provide an apparatus in which the hydraulic retention time of said process is shorter in comparison to conventional biogas facilities.

The above and other purposes and advantages of the invention will become apparent as the description proceeds.

SUMMARY OF THE INVENTION

The invention provides a feedstock treatment apparatus for processing liquid livestock or poultry waste, comprising a) a stirred feed vessel for feeding homogenized and optionally diluted liquid feedstock to an anaerobic reactor; b) two anaerobic reactors in recycling communication selected from anaerobic sequencing batch reactors (ASBR); c) an aerobic reactor selected from sequencing batch reactors (SBR) in recycling communication with at least one of said two anaerobic reactors; d) a stirring means for independent stirring of said reactors; e) a discharge basin connected to at least one of said two anaerobic reactors for receiving a portion of settled waste from said at least one anaerobic reactors; f) a safe water vessel for receiving a top portion of water from said aerobic reactor; g) a gas collector for collecting biogas produced in at least one of said anaerobic reactors; and h) a transfer means for transferring fluids into, out from, and through said reactors and for regulating the flow of said fluids, the means comprising conduits, valves, pumps, sensors, and a processor; wherein said stirring means are configured to alternately work to allow for homogenization of the reactor contents during a stirring cycle and to stop to allow for settling solids in the reactors contents during a settling cycle, wherein said fluids comprise biogas and water, wherein said water is transferred out from the reactors in batches during their settling cycles, and wherein said processor is configured to receive signals from said sensors and send signals to said stirring means, valves, and pumps. Said safe water vessel may be in recycling communication with said feed vessel. Said discharge basin may comprise a facility for converting said waste from said anaerobic reactors to soil amendment. The aerobic reactor comprises an efficient aeration device. Said anaerobic reactors may comprise means to regulate temperature. Said transfer means may further comprise gravity driven means. In some embodiments, said livestock waste to be treated originates from pig farms, cattle farms, dairy farms, or chicken farms. In a preferred embodiment, said livestock waste to be treated in the apparatus of the invention at least partially originates from pig farms, cattle farms, dairy farms, or chicken farms.

The invention provides a process for treating feedstock comprising liquid livestock or poultry waste, comprising i) collecting feedstock comprising said waste in a feed vessel; ii) optionally diluting and homogenizing said feedstock into homogenized liquid waste; iii) transferring said homogenized waste from said feed vessel to a first anaerobic reactor selected from anaerobic sequencing batch reactors (ASBR), and from said first ASBR to a second ASBR; iv) facilitating the anaerobic digestion of waste by repeated stirring and settling cycles, the stirring cycles comprises mixing the liquid waste in said ASBR, and the settling cycles allowing solids in said waste liquid to at least partially settle in said two anaerobic reactors, wherein a portion of settled liquid waste from the bottom part of said second ASBR during its settling cycle is transferred to said first ASBR; v) transferring a portion of treated waste from the top part of said second ASBR during its settling cycle to an aerobic sequencing batch reactor (SBR); vi) facilitating the aerobic digestion of waste by repeated stirring and settling cycles, the stirring cycles comprising aeration and mixing of liquid waste in said SBR, and the settling cycles allowing solids in said waste liquid to at least partially settle; vii) transferring a portion of liquid from the bottom part of said SBR during its settling cycle to at least one of said two ASBR; viii) transferring a portion of liquid from the top part of said SBR during its settling cycle to a safe water vessel; and ix) transferring a portion of settled liquid waste from at least one of said two anaerobic reactors during their settling cycle to a discharge basin; wherein said transferring steps are managed by transferring means comprising conduits, valves, pumps, sensors, and a processor, said processor configured to receive signals from said sensors and to send signals to start or stop said stirring, start or stop pumps, and pen or close valves. Said step ii) may comprise diluted said feedstock with water from the safe water vessel, or with recycled milking wastewater from a dairy farm milking parlor and holding areas, or any available water source. The liquid waste in said discharge basin may be dried or may undergo Aerated Static Pile (ASP) with an air blower for obtaining soil amendment; it also may be mixed with cellulose or woodchips, or it may be otherwise processed to provide a high quality fertilizer. The process of the invention comprises steps carried out in batches. For example, above steps iii), v), and viii) of transferring are performed in 2 to 6 batches per day. In some embodiments, said livestock waste to be treated originates from pig farms, cattle farms, dairy farms, or chicken farms. In a preferred embodiment, said livestock waste to be treated by the method of the invention at least partially originates from pig farms, cattle farms, dairy farms, or chicken farms.

In some embodiments, the water vessel is in recycling communication with the feed vessel, for allowing recycling of treated water within the apparatus, as needed.

In some embodiments, the temperature in the anaerobic reactors is regulated, thus the anaerobic reactors may further comprise means to regulate the temperature. Anaerobic digestion may be performed under mesophilic or thermophilic conditions.

The invention relates to a system for efficiently processing waste, and particularly wastewater, from livestock and poultry industry.

BRIEF DESCRIPTION OF THE DRAWINGS

The above and other characteristics and advantages of the invention will be more readily apparent through the following examples, and with reference to the appended drawings, wherein.

DETAILED DESCRIPTION

The present apparatus and process usefully provide an integrated ecosystem solution. The apparatus is based on Anaerobic Digestion (AD) technology that allows nutrient recovery, generates energy in the form of biogas, which may be further processed to obtain electricity and heat. The water effluent (safe water) is safe for discharging into the sewage system (by sewage discharge levels permitted according to Israeli regulations) and/or reuse subsequent to additional filtration for enhancing water quality. Advantageously, the apparatus can treat waste from an entire dairy farm: milking wastewater from the milking parlor and holding areas and manure waste from the feeding areas. Additionally, treatment of waste by the apparatus solves the problem of digestate production, one of the main shortcomings of other AD facilities, without further chemical treatment costs. This brings about additional economic value, as the costs associated with digestate storage, transport, and soil destruction are avoided.

The integrated ecosystem solution, according to some embodiments, confers the following environmental benefits: 1) significant reduction of air pollution from $CH_4$, $H_2S$, $NH_3$ and $N_2O$; 2) significant reduction of water pollution from runoff of $NO_3$, TP, $Na^+$, and $Cl^-$. The safe water effluent from the apparatus meets strict regulatory parameters for COD and BOD content. The safe water effluent may be recycled within the apparatus, for example, it is used for dilution of the feedstock; and 3) significant reduction of soil salinity and pathogen contamination. The soil amendment byproduct of the apparatus provides farmers with a superior alternative to conventional ammonia based liquid fertilizers.

Further economic advantages of the apparatus lie in its small groundplan, and in low operating and maintenance costs (automated system, low consumption of electricity and no added chemicals).

In a first aspect, the invention is directed to an apparatus and a process for treating feedstock and providing safe water, and optionally biogas and soil amendment. In one embodiment, the apparatus comprises a stirred feed vessel, two stirred anaerobic reactors, a stirred aerobic reactor and a water vessel.

As used herein, the term "feedstock" refers to organic waste, such as sewage sludge, livestock or poultry waste, food and drink waste, including slaughterhouse, bakery or brewery waste, and agricultural waste, but the invention is not limited to any specific feed material.

As used herein, the term "soil amendment" refers to the dry matter obtained after drying the portion of waste (sludge) discharged from the anaerobic reactor of the apparatus. The soil amendment may undergo further processing and may be advantageously used as soil improver.

As used herein, the term "safe water" refers to water which may be discharged to the local sewage system, hence the water meets sewage discharge levels permitted by the local regulations, for example, the regulations of the Israeli Ministry of Environmental Protection, or the US Environmental Protection Agency (EPA). The term also encompasses water which may undergo water polishing for irrigation.

In some embodiments, the apparatus and process are designed for treating livestock waste from pig, cattle, dairy, or chicken farms. The apparatus of the invention is particularly advantageous for dairy farms, and can be scaled according to the need.

The apparatus and process can be adjusted according to the quality of the feedstock. For example, in some embodiments, livestock waste may be co-digested with poultry waste, food waste and agricultural waste.

Figure 1:
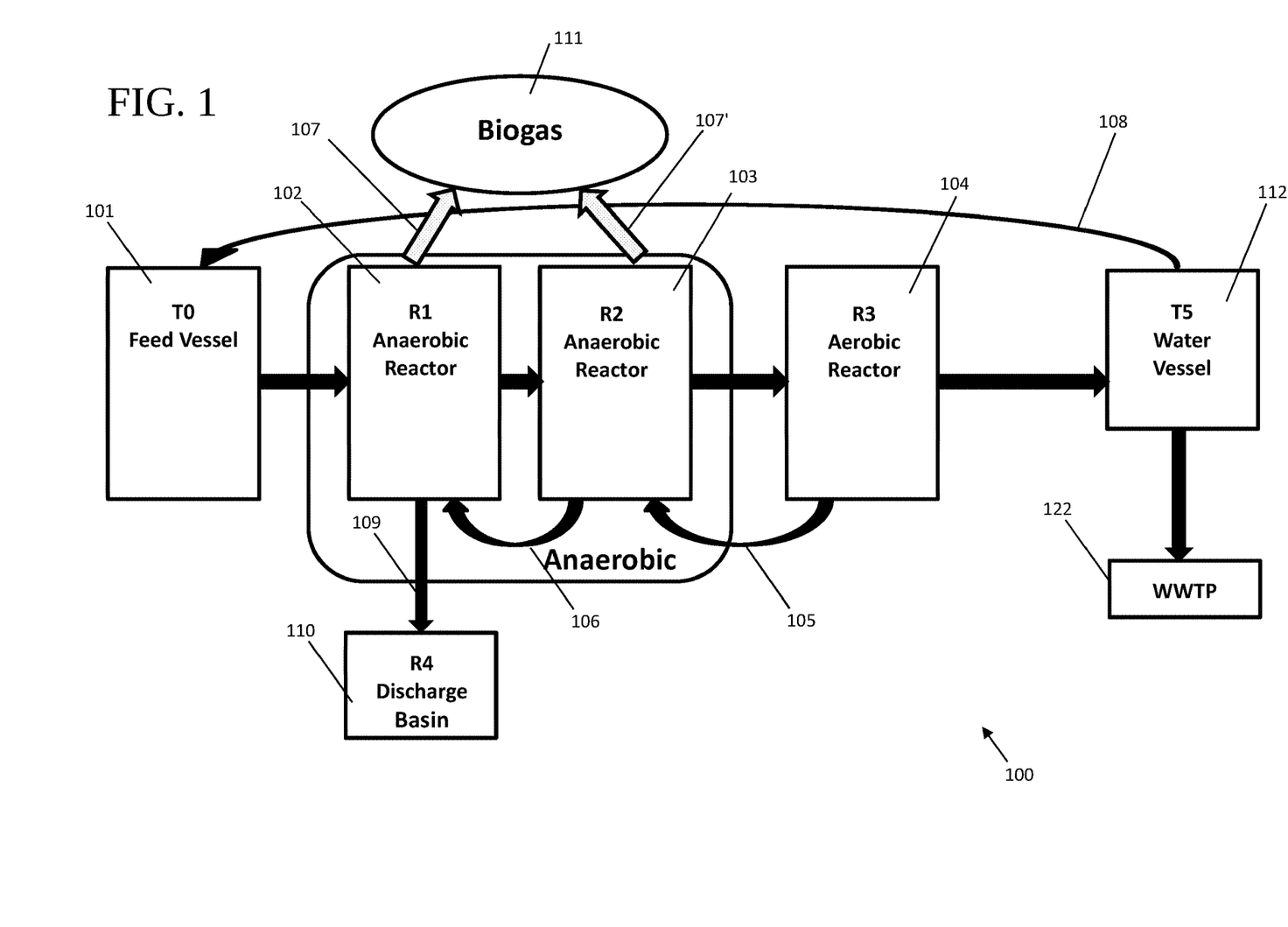
FIG. 1 is a schematic representation of a feedstock treatment apparatus according to one embodiment of the invention.

The apparatus according to some embodiments of the invention, 100, comprises the components schematically depicted in FIG. 1. Feedstock is fed into a stirred feed vessel 101 (T0), where it may be diluted using recycled water from the water vessel 112 (T5), or with milking wastewater from the milking parlor and holding areas and homogenized by mixing. The diluted feedstock waste then flows into a first stirred anaerobic reactor 102 (R1). After repeated cycles of mixing and settling of the waste, thereby anaerobically digesting the waste, a top portion of the waste is transferred to a second stirred anaerobic reactor 103 (R2), where it is further digested by performing repeated cycles of mixing and settling. After settling of the waste in the second anaerobic reactor 103, a top portion of the waste is transferred to the stirred aerobic reactor 104 (R3) for further digestion. Waste is digested by repeated cycles of aeration and mixing of waste in the aerobic reactor 104 followed by allowing the waste to settle. A bottom portion of sludge 105 is transferred from the aerobic reactor 104 to the second anaerobic reactor 103. A bottom portion of sludge 106 is also transferred from the second anaerobic reactor 103 to the first anaerobic reactor 102. The anaerobic reactors comprise gas collectors 107 and 107' for collection of biogas produced in the reactors 102, 103 into a collection vessel 111. Water from a top portion of the aerobic reactor 104 is transferred to the water vessel 112, from which, in some embodiments it is recycled into the feed vessel 101 (via stream 108) for diluting feedstock. In some other embodiments, the safe water effluent 112 is discharged into the sewage system. According to some embodiments, a bottom portion of sludge 109 from the first anaerobic reactor 102 is transferred to a discharge basin 110. Thus, according to one embodiment of the invention, feedstock fed into the apparatus is digested to produce safe water, soil amendment and biogas.

As used herein, the term "portion" denotes a volume of waste or sludge which is determined according to the size of the reactors in the apparatus. Accordingly, it will be appreciated by the skilled person that the volume of said portion is scalable and is set according to the capacity of the apparatus and other considerations. The volume of said portion may also vary according to the components of the apparatus from which and to which the portion is being transferred. For example, a portion transferred from the second anaerobic reactor 103 to the first anaerobic reactor 102 may be $1/15$ of the amount of waste treated per day, while the portion transferred from the aerobic reactor 104 to the water vessel 112 may be $14/15$ of the amount of waste treated per day.

As used herein, the term "bottom portion of waste" or "bottom portion of sludge" refers to material that can be drawn from the bottom portion of a reactor. In this respect, the bottom portion will normally be considered the bottom third of the reactor, but the withdrawal point can be located at various heights and positions in the reactor, and is not limited to any particular location.

In one embodiment, the invention provides an apparatus for treating feedstock comprising a stirred feed vessel for feeding feedstock to an anaerobic reactor; two stirred anaerobic reactors in recycling communication; a stirred aerobic reactor in recycling communication with at least one of said two anaerobic reactors; and a water vessel for receiving water released from said aerobic reactor, where the components are in communication with one another through conduits.

In some embodiments, the water vessel is in recycling communication with the feed vessel, thereby allowing self-dilution of the feedstock, as needed. In some embodiments, the feedstock is diluted to contain between 2 and 6% total solids (TS). In some embodiments the feed vessel comprises a measurement device for continuous measurement of the total suspended solids (TSS), thereby indicating the need for dilution of the feedstock. According to some of these embodiments, the feed vessel comprises a mechanical chopper for chopping large solid particles in the feedstock.

As used herein, the term "recycling communication" is used to indicate that the liquid, waste, sludge or gas may be recycled from one component of the apparatus to another, i.e. the waste is transferred between components of the apparatus. The term also encompasses transfer of portions of waste. Accordingly, it should be understood that a reactor is considered to be found in recycling communication with another reactor if it either transfers waste from itself to another reactor, or receives waste transferred to it from another reactor, even though it may not transfer waste to another reactor.

As used herein, the term "conduit" relates to a channel or tube for transferring liquid, waste, sludge or gas from one component of the apparatus to another. Such conduits may be tubes or pipes. Conduit also encompasses a direct connection from one component to another. Pumps and valves can be included in a conduit to facilitate transfer of liquid, waste, sludge or gas. In some embodiments the conduits further comprise valves capable of opening and closing for regulating the flow of fluids or waste.

In some embodiments, the apparatus further comprises transfer means for aiding the transfer of waste. Such means may be, for instance, pumps and gravity driven means.

In some embodiments, the aerobic reactor of the present invention comprises an aeration device. As used herein, the term "aeration device" relates to a device that supplies air or oxygen into a reactor. Aeration devices include mechanical aerators or compressed air.

In some embodiments, the aerobic reactor has aerobic and anoxic phases for the efficient removal of nitrogen from the waste (denitrification). During the aerobic phase, nitrogen is converted into nitrate (nitrification). The nitrified waste is then exposed to an environment without free oxygen (anoxic), and under these conditions microorganisms use nitrate as an electron acceptor and release nitrogen in the form of nitrogen gas.

During aerobic digestion, nitrogen and phosphorus are removed in a process called Biological Nutrient Removal (BNR). Additionally, and this is a further advantage of the present invention, sodium is removed from the waste by biomass assimilation thus resulting in an effluent of safe water). The treatment enables the removal of high levels of suspended solids and organic matter, as shown by the reduced levels of Chemical Oxygen Demand (COD) and Biochemical Oxygen Demand (BOD), as well as reduced nitrogen, phosphorus, and sodium.

In some embodiments, the anaerobic reactors may comprise a gas collector for collecting biogas containing methane. In some embodiments, means for measuring amount of methane produced can also be included in the apparatus.

According to some embodiments, Pressure swing adsorption (PSA) technology may be applied to extract the methane from the biogas, which may then be injected into natural gas pipelines. In other embodiments, the biogas, mainly purified methane, may be used by applying Combined Heat and Power (CHP) technology to generate electricity and residual heat. In some of these embodiments, the residual heat may be used for heating the reactor, heating the livestock houses or for cooling using an adsorption chiller. The electricity produced may be transferred to the local grid distributer.

Anaerobic digestion may be performed under mesophilic or thermophilic conditions. In other embodiments, thermophilic temperatures of between 45 to 55° C. are maintained in the anaerobic reactors. While according to other embodiments, mesophilic temperatures of between 32 to 40° C. are maintained in the anaerobic reactors. The latter embodiment involves reduced costs associated with heating, as compared to the costs for maintaining thermophilic conditions. Thus, the apparatus may further comprise means for regulating temperature.

The present invention is applicable to any anaerobic and aerobic reactors. Such reactors are also not limited to any geometric form or size.

The anaerobic reactors employed in the apparatus of the invention are selected from anaerobic sequencing batch reactors (ASBR).

The aerobic reactors employed in the apparatus are selected from sequencing batch reactors (SBR).

Feedstock is digested in the two anaerobic reactors of the apparatus by repeated cycles of mixing waste and allowing the waste to settle, during the settling, solids sediment and the waste closer to the bottom may be transferred to a discharge basin for obtaining the soil amendment. Thus, in some embodiments, the feedstock treatment apparatus further comprises a discharge basin connected to at least one of the two anaerobic reactors.

In some embodiments the discharged waste (sludge) may be dried or mixed with cellulose or woodchips for obtaining soil amendment. According to some embodiments, the discharged waste undergoes Aerated Static Pile (ASP) by forcing or pulling air through the pile of discharged waste, thereby drying and solidifying the sludge into dry matter (termed herein "soil amendment"). In some of these embodiments, the flow of air is generated by a low electric consumption air blower. Preferably, the air is blown through the pile of discharged waste (sludge) from between 4 to 12 hours per day. In some further embodiments, woodchips are added as a bulking agent to enhance the air flow and for adding porosity to the pile. In some further embodiments, the soil amendment is stabilized by the long SRT (Sludge Retention Time) consisting of about 22 days of anaerobic treatment, 37 days of aerobic treatment and at least 60 days in the ASP, resulting in total stabilization of around 120 days.

In some embodiments, the soil amendment obtained, advantageously, is characterized by having particles of less than 10 mm in size. In some embodiments, the pile of soil amendment has reduced odor and does not attract flies, mosquitos etc. Furthermore, among the many advantages of the present invention, the apparatus facilitates biological nutrient recovery as the soil amendment meets Grade A compost requirements, making it an excellent soil improver.

According to some embodiments, the quality of the soil amendment obtained may be regulated according to the needs, for example by modifying the sludge/cellulose ratio, or by employing various types of cellulose waste.

In some embodiments, the discharged waste (sludge) may be dried and used as organic bedding for livestock.

Figure 2:
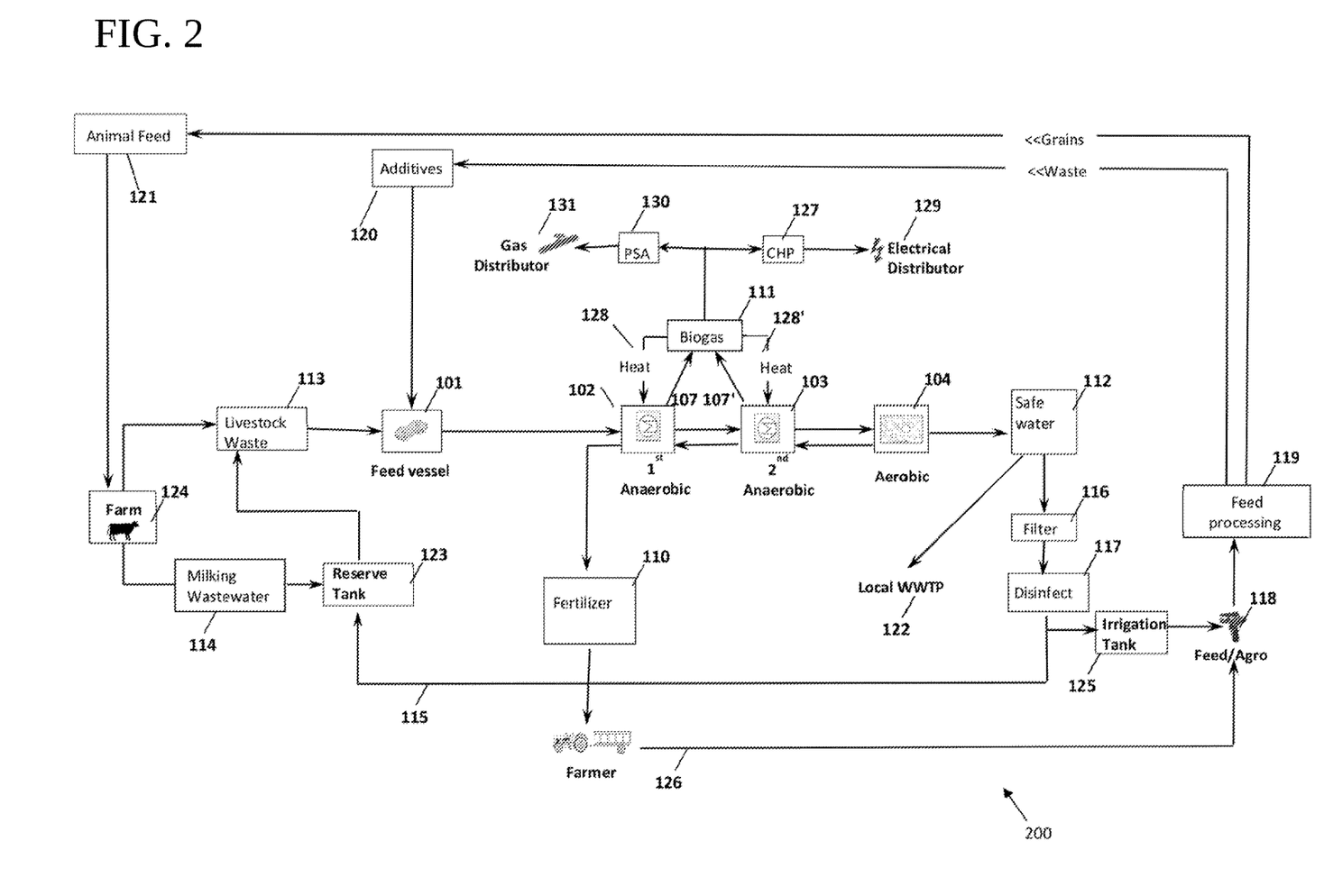
FIG. 2 is a schematic representation of an integrated ecosystem solution according to one embodiment of the invention.

FIG. 2 schematically shows the integrated ecosystem solution 200 according to one embodiment of the invention, in which livestock waste 113 and milking wastewater 114 are converted into safe water effluent 112, which may be recycled within the system, soil amendment 110 and biogas 111 as side products. The integrated ecosystem 200 includes the apparatus comprising a stirred feed vessel 101, two stirred anaerobic reactors 102, 103, a stirred aerobic reactor 104 and a water vessel 112. Livestock waste 113 is fed to the feed vessel 101, where it is diluted with recycled wastewater from the milking parlor and holding areas ("milking wastewater") 114 or with safe water recycled within the apparatus 115, and homogenized by mixing. According to some embodiments, milking wastewater 114 may be directly transferred into the aerobic reactor 104 for treatment. The diluted waste is transferred to a first of two anaerobic reactors 102 where it undergoes anaerobic digestion by repeated cycles of mixing and settling of the waste. In some embodiments, the transfer of waste into the first anaerobic reactor 102 is performed in batches, according to some of these embodiments, the batches are between 2 to 6 batches per day. A top portion of the settled waste is transferred to a second anaerobic reactor 103 where it is further digested by performing repeated cycles of mixing and settling. After settling a top portion of the waste is transferred from the second anaerobic reactor 103 to an aerobic reactor 104 for further digestion of the waste. In some embodiments, the transfer of waste into the aerobic reactor is performed in batches, according to some of these embodiments, the batches are between 2 to 6 batches per day. Waste is aerobically digested in the aerobic reactor 104 by repeated cycles of aeration and mixing of waste followed by allowing the waste to settle. After settling, a bottom portion of sludge is transferred from the aerobic reactor 104 back to the second anaerobic reactor 103. Additionally, a bottom portion of sludge is transferred from the second anaerobic reactor 103 to the first anaerobic reactor 102. The anaerobic reactors 102, 103 comprise gas collectors 107, 107' for collection of biogas 111 produced in the reactors. Water from a top portion of the aerobic reactor 104 is transferred to the water vessel 112, from which, in some embodiments it is recycled 115 for self-dilution of livestock waste 113. A bottom portion of sludge from the first anaerobic reactor 102 is transferred to a discharge basin 110 where it is dried thereby obtaining high quality soil amendment. The soil amendment may be further enriched and used in plant agriculture 126.

In some embodiments the safe water effluent 112 may further undergo filtering 116 and disinfection 117. Such filtering processes may be performed using a sand filter, media filter and carbon filter. Disinfection may be performed using Ultraviolet (UV). Additional purification steps may be added to modify the quality of the safe water effluent 112 according to the relevant requirements and regulations, for example reverse osmosis (RO) may be applied to obtain purified water.

In some embodiments, the safe water effluent 112 is discharged into the sewage system or to a WWTP 122. In other embodiments, the safe water effluent is used for irrigation 118 or for processing of feed 119 such as grains for feeding animals 121 on the farm 124 or additives to be treated in the apparatus 120.

In some embodiments, the integrated ecosystem solution 200 may further comprise storage and reserve tanks 125, 123, as necessary.

According to some embodiments, the biogas 111 may be used by applying Combined Heat and Power (CHP) 127 technology to generate electricity and heat. In some of these embodiments, heat may be used for heating the reactor 128, 128'. The electricity produced may be transferred to the local grid distributer 129. In other embodiments, Pressure swing adsorption (PSA) technology 130 may be applied to extract the methane from the biogas, which may then be injected into natural gas pipelines 131.

In one embodiment, the invention provides a process for treating feedstock comprising a combination of one or more of the following steps:

i) collecting feedstock in a feed vessel;
ii) diluting and homogenizing feedstock into waste;
iii) transferring the waste from the feed vessel to at least one of two anaerobic reactors;
iv) facilitating the anaerobic digestion of waste by repeated cycles of mixing waste and allowing the waste to settle in the two anaerobic reactors, wherein a portion of waste is recycled between the two anaerobic reactors;
v) transferring treated waste from at least one of the two anaerobic reactors to an aerobic reactor;
vi) facilitating the aerobic digestion of waste by repeated cycles of aeration and mixing of waste in the aerobic reactor followed by allowing the waste to settle;
vii) transferring a bottom portion of waste from the aerobic reactor to at least one of the two anaerobic reactors; and
viii) transferring a top portion of waste from the aerobic reactor to a water vessel.

Although the steps of the process are depicted in a particular order, it should not be understood that such steps are completed in a particular order as shown or in a successive sequence. In some cases, multi-step or parallel-processing would be advantageous. Likewise, although the example provided herein includes some specific implementation details, it should not be construed as limiting the scope of the claims, but should be viewed as a particular embodiment of the process.

According to some embodiments, the feedstock is diluted in the feed vessel with recycled water from the water vessel. In some embodiments the feedstock is diluted in the feed vessel with recycled milking wastewater originating from a dairy farm milking parlor and holding areas.

In some embodiments, the process further comprises a step of transferring a portion of sludge from the bottom part of at least one of said two anaerobic reactors to a discharge basin for obtaining soil amendment.

In some embodiments, the process further comprises a step of collecting biogas via a gas collector from at least one of said two anaerobic reactors.

In some embodiments, the transfer of waste from the feed vessel to at least one of the two anaerobic reactors and from at least one of the two anaerobic reactors into the aerobic reactor is performed in batches, according to some of these embodiments, the batches are between 2 to 6 batches per day.

The invention provides a non-complex apparatus and process, without expensive equipment, flexible and scalable, particularly for treating feedstock and milking wastewater from dairy farms comprising anaerobic and aerobic treatment.

The invention will be further described and illustrated in the following example.

EXAMPLES

The following acronyms are used herein:
ASBR Anaerobic Sequencing Batch Reactor
SBR Sequencing Batch Reactor
COD Chemical Oxygen Demand
BOD Biochemical Oxygen Demand
TS Total Solids
VS volatile Solids
TSS Total Suspended Solids
TKN Total Kjehldahl Nitrogen
TP Total Phosphorus
TN Total Nitrogen
WAS Waste Activated Sludge

Example 1

Apparatus Description

An apparatus having a 400 m² groundplan was built on a dairy farm in Israel for treating the waste of 100 cows. The apparatus comprises a stirred feed vessel (T0), two stirred ASBRs (R1 and R2), an aerobic SBR (R3), a water vessel (T5) and a discharge basin (R4), as illustrated in FIG. 1. Biogas is collected from the two ASBRs. Cow manure having 13% TS was diluted to 2.5% TS using milking wastewater and 10 m³ of waste was treated daily.

Treating:

$$10 \frac{m^3}{day}$$

of waste

Reactors size:
Total size: each reactor: 100 m³
Operational size of the anaerobic reactors: 60 m³ each
Operational size of the aerobic reactor: 30 m³
Hydraulic retention Time (HRT) for each anaerobic reactor:

$$\frac{60}{10 \frac{m^3 m^3}{day}} = 6 \text{ days}$$

Hydraulic retention Time (HRT) for the aerobic reactor:

$$\frac{30}{10\frac{m^3 m^3}{day}} = 3 \text{ days}$$

Reactor's mass balance:

$$9.5 \frac{m^3}{day} \text{ of treated water} + 0.5 \frac{m^3}{day} \text{of sludge} = 10 \frac{m^3}{day}$$

Solids Retention Times (SRT) are no longer than: 60 days.

It will be appreciated by the skilled person, that the HRT for each anaerobic reactor of 6 days may be further reduced, for example to a HRT of 3 days.

Example 2

Apparatus Performance

A. Safe Water Effluent

Table 1 shows the average performance of the apparatus in terms of safe water quality.

TABLE 1

| Parameter | Units | Influent | Safe Water Effluent | Sewage discharge levels * | % Removal |
|---|---|---|---|---|---|
| COD | g/L | 40 ± 16.5 | 2 ± 0.4 | <2 | 95% |
| TSS | g/L | 25 ± 3 | 0.7 ± 0.3 | <1 | 97% |
| TKN | g/L | 1.2 ± 0.4 | 0.15 ± 0.05 | <0.1 | 88% |
| TP | mg/L | 230 ± 30 | 55 ± 13 | <30 | 76% |
| Ammonia | mg/L | 580 ± 115 | 10 ± 5 | — | 98% |

* according to Israeli regulations

At the end of the process, the safe water effluent was within the permitted parameters for discarding into the sewage system, as shown for Chemical Oxygen Demand (COD), Total Suspended Solids (TSS), Total Kjehldahl Nitrogen (TKN) and Total Phosphorus (TP) levels.

Figure 3:
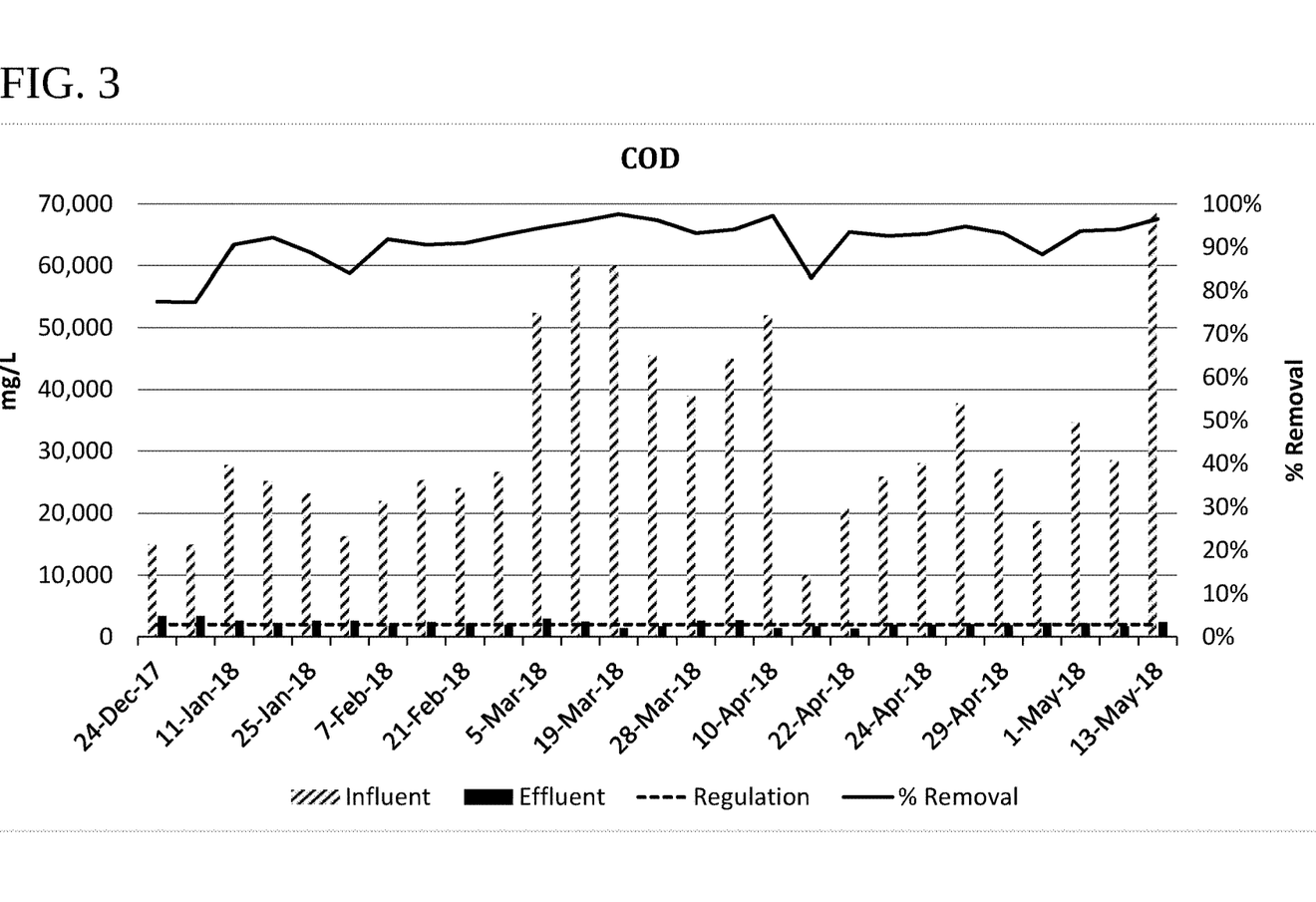
FIG. 3 shows Chemical Oxygen Demand (COD) levels of the influent and effluent for an apparatus according to one embodiment of the invention.

The results in FIG. 3 show COD measurements of the influent and effluent of the apparatus measured on various days. On most days over 90% of COD is removed, and these levels meet regulatory parameters for COD content permitted for discharge into the sewage system.

Figure 4:
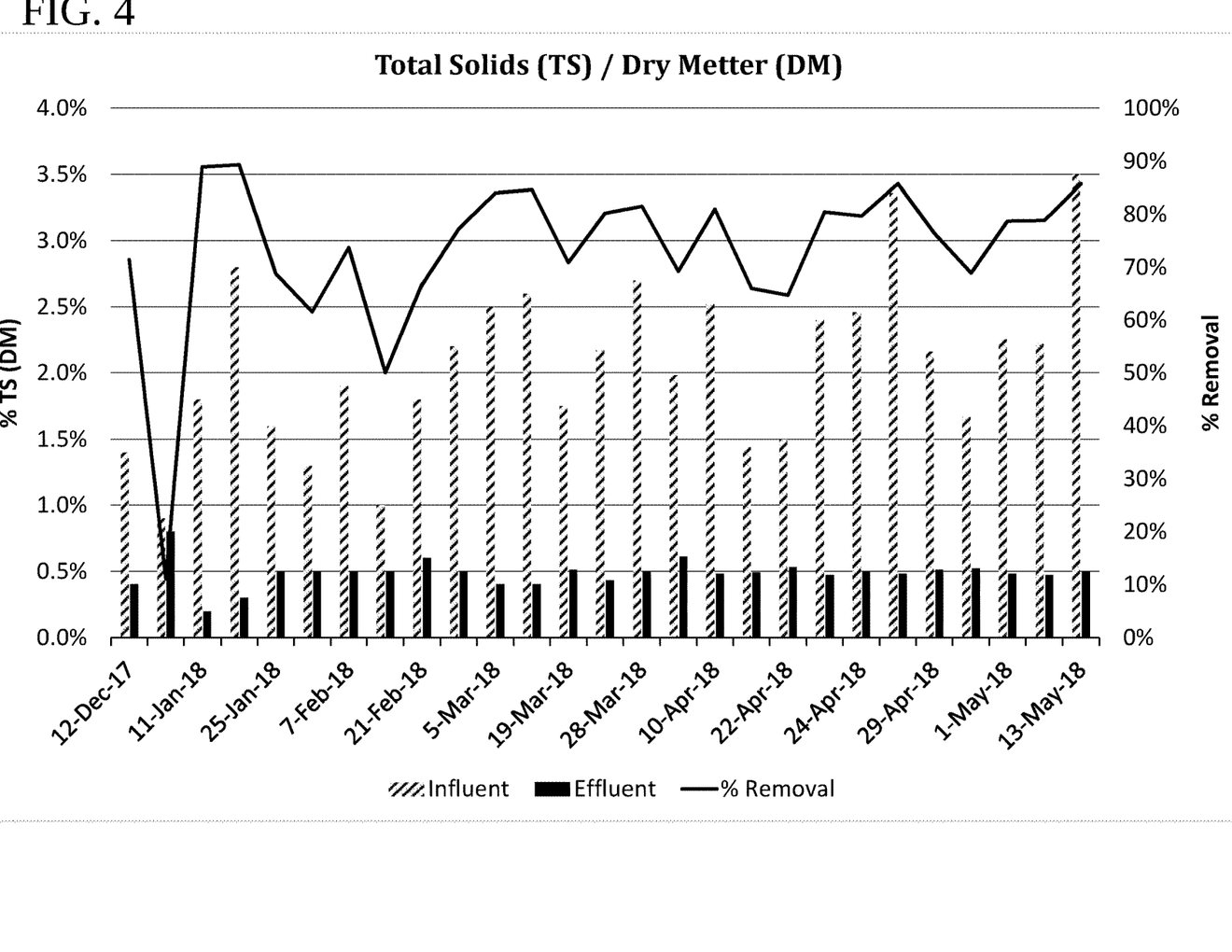
FIG. 4 shows % Total Solids (TS) level (Dry Matter—DM) of the influent and effluent for an apparatus according to one embodiment of the invention.

Total Solids (TS) are diluted in the influent to between 1 and 3.5%. FIG. 4 shows % TS (Dry Matter—DM) in the influent and effluent of the apparatus as measured on various days. On most days, the removal of dry matter is very high, with an effluent having less than 0.5% TS.

Table 2 shows the mass balance summary of the apparatus on a single day.

TABLE 2

|  | Manure | Influent | Safe Water Effluent | Discharged Sludge | % Internal Reduction | % Overall Reduction |
|---|---|---|---|---|---|---|
| % TS | 13.0 | 2.58 | 0.37 | 6.31 | 86% | 97% |
| TN (mgL) | 4,160 | 2,690 | 98 | 1868 | 96% | 98% |
| TP(mgL) | 3,640 | 608 | 52 | 947 | 91% | 99% |
| Na$^+$ (mgL) | 3,900 | 628 | 420 | 377 | 33% | 89% |
| Cl$^-$ (mgL) | 1,560 | 697 | 504 | 495 | 28% | 68% |
| K (mgL) | 1,950 | 1,262 | 676 | 762 | 46% | 65% |
| TKN (mgL) | — | 1,407 | 89 | 1857 | 94% | — |
| TNH$_4$-H (mgL) | — | 574 | 12 | 991 | 98% | — |
| NO$_3$ (mgL) | — | 1,283 | 9 | 10.5 | 99% | — |

B. Biogas Production

Figure 5:
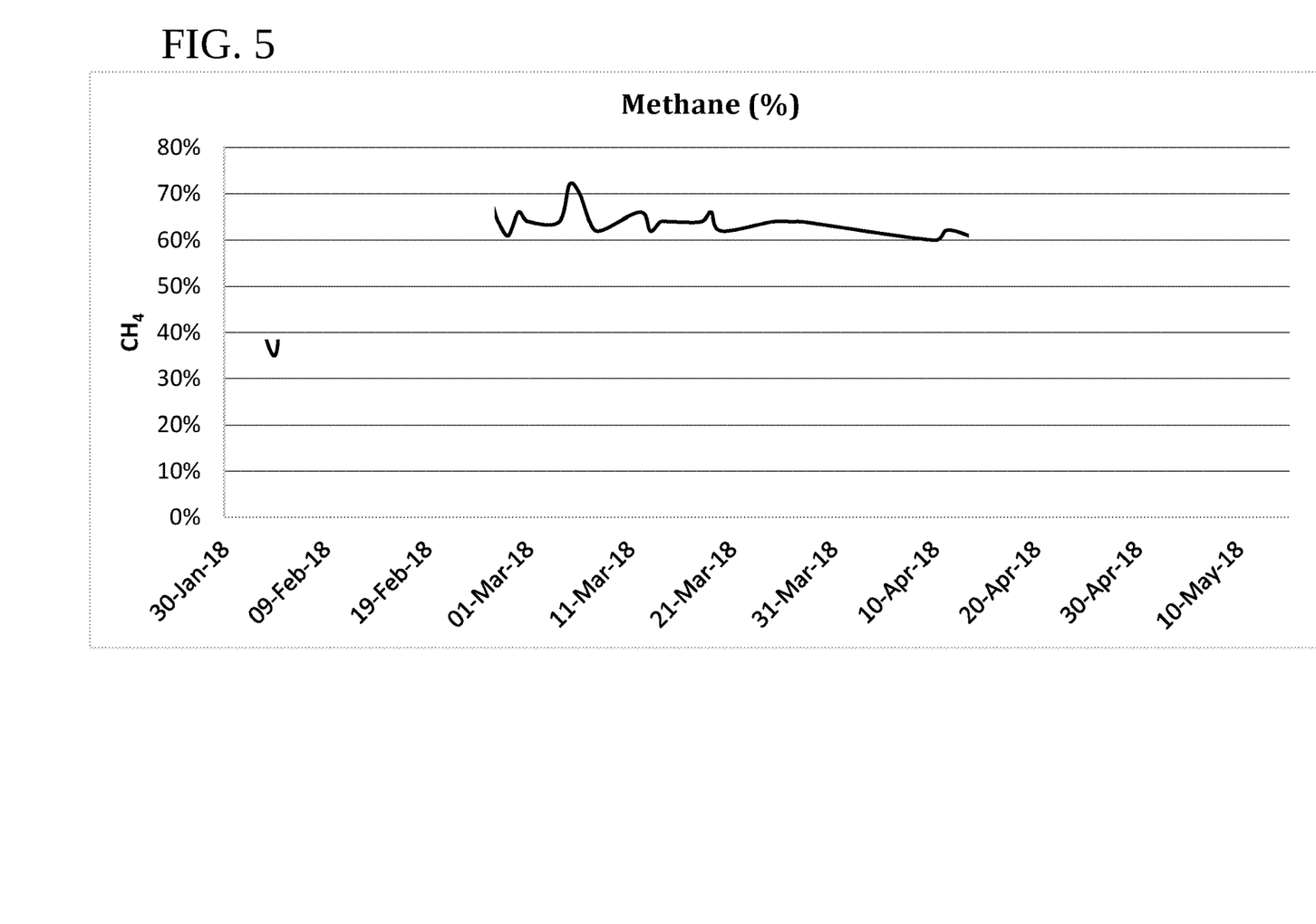
FIG. 5 shows the % methane ($CH_4$) in the biogas produced in an apparatus according to one embodiment of the invention.

FIG. 5 shows the % methane ($CH_4$) in the biogas produced in the anaerobic reactors of the apparatus on various days. On average, the biogas contains 65% methane.

C. Discharged Sludge

The sludge discharged from the anaerobic reactor (R1) was collected in an aerated discharge basin (R4) where it was subject to Aerated Static Pile (ASP) technology for solidification and drying. After 60 days the dry matter (soil amendment) was inspected. Visual particles had a size of less than 10 mm. The odor of the soil amendment was sweet-smelling and fruity and no flies, mosquitos etc. were observed. Table 3 shows the average characteristics of the soil amendment.

TABLE 3

| | Grade A compost | Grade B compost | Unit | Soil Amendment Sample |
|---|---|---|---|---|
| 1. General | | | | |
| Particle Size | <20 | — | Mm | <10 |
| External Partials | 5 | 10 | % per % TS | <5 |
| % TS | 60-75 | 60-75 | % | 33% |
| % Humidity | 25-40 | 25-40 | % | 67% |
| Ash/TS | — | — | % | 46% |
| VS/TS | >35% | >25% | % | 54% |
| C/N (Carbon to Nitrogen ratio) | As declared | As declared | # | 37 |
| pH | 5-8.5 | 5-8.5 | # | 7.34 |
| 2. Inorganic | | | | |
| N | As declared | As declared | % per % TS | 2.48% |
| P | As declared | As declared | % per % TS | 3.34% |
| K | As declared | As declared | % per % TS | 1.89% |
| Na | As declared | As declared | % per % TS | 1.40% |
| B | <200 | <200 | mg/kgTS | 0.02 |
| 3. Heavy metals | | | | |
| Hg | 5 | 5 | mg/kgTS | — |
| Cr | 400 | 400 | mg/kgTS | 4 |
| Ni | 90 | 90 | mg/kgTS | 19 |
| Cd | 20 | 20 | mg/kgTS | 1 |

TABLE 3-continued

|  | Grade A compost | Grade B compost | Unit | Soil Amendment Sample |
|---|---|---|---|---|
| Pb | 300 | 300 | mg/kgTS | 2 |
| Cu | 600 | 600 | mg/kgTS | 78 |
| Zn | 2500 | 2500 | mg/kgTS | 311 |
| 4. Bacterium | | | | |
| Total Coliform | — | — | — | 2,100 |
| Facet Coliform | 1,000 | <2,000,000 | MPN/g DM | — |
| Salmonella | <3 | — | MPN/g DM | <3.0 |
| 5. Application to Crops (per compost grade A based on IS 801) | | | | |
| EC (Electric conductivity) | | | dS/m | 2.9 |
| Sensitive crops | per table | per table | m3/dun. | 2.0 |
| Un-sensitive crops | per table | per table | m3/dun. | 8.0 |
| 6. Other | | | | |
| SAR (Sodium Adsorption Ratio) | — | — | # | 1.39 |

Although embodiments of the invention have been described by way of illustration, it will be understood that the invention may be carried out with many variations, modifications, and adaptations, without exceeding the scope of the claims.

The invention claimed is:

1. A feedstock treatment apparatus for processing liquid livestock or poultry waste, comprising
   a) a stirred feed vessel for feeding homogenized and optionally diluted liquid feedstock to a first anaerobic reactor;
   b) a second anaerobic reactor in recycling communication with said first anaerobic reactor, each of said first and second anaerobic reactors being an anaerobic sequencing batch reactors (ASBR);
   c) an aerobic reactor sequencing batch reactors (SBR) in recycling communication with at least one of said two anaerobic reactors;
   d) a stirring means for independent stirring of said reactors;
   e) a discharge basin connected to at least one of said two anaerobic reactors for receiving a portion of settled waste from said at least one anaerobic reactors;
   f) a safe water vessel for receiving a top portion of water from said aerobic reactor;
   g) a gas collector for collecting biogas produced in at least one of said anaerobic reactors; and
   h) a transfer means for transferring fluids into, out from, and through said reactors and for regulating the flow of said fluids, the means comprising conduits, valves, pumps, sensors, and a processor; wherein said stirring means are configured to alternately work to allow for homogenization of the reactor contents during a stirring cycle and to stop to allow for settling solids in the reactors contents during a settling cycle, wherein said fluids comprise biogas and water, wherein said water is transferred out from the reactors in batches during their settling cycles, and wherein said processor is configured to receive signals from said sensors and send signals to said stirring means, valves, and pumps.

2. The feedstock treatment apparatus according to claim 1, wherein said safe water vessel is in recycling communication with said feed vessel.

3. The feedstock treatment apparatus according to claim 1, where said discharge basin facilitates conversion of said waste from said anaerobic reactors to soil amendment.

4. The feedstock treatment apparatus according to claim 1, wherein the aerobic reactor comprises an aeration device.

5. The feedstock treatment apparatus according to claim 1, wherein said two anaerobic reactors further comprise means to regulate temperature.

6. The feedstock treatment apparatus according to claim 1, wherein said transfer means comprise gravity driven means.

7. A process for treating feedstock comprising liquid livestock or poultry waste, comprising:
   i) collecting feedstock comprising said waste in a feed vessel;
   ii) diluting and homogenizing said feedstock into homogenized liquid waste;
   iii) transferring said homogenized liquid waste from said feed vessel to a first anaerobic reactor selected from anaerobic sequencing batch reactors (ASBR), and from said first ASBR to a second ASBR;
   iv) facilitating the anaerobic digestion of waste by repeated stirring and settling cycles, the stirring cycles comprises mixing the liquid waste in said ASBR, and the settling cycles allowing solids in said waste liquid to at least partially settle in said two anaerobic reactors, wherein a portion of settled liquid waste from the bottom part of said second ASBR during its settling cycle is transferred to said first ASBR;
   v) transferring a portion of treated waste from the top part of said second ASBR during its settling cycle to an aerobic sequencing batch reactor (SBR);
   vi) facilitating the aerobic digestion of waste by repeated stirring and settling cycles, the stirring cycles comprising aeration and mixing of liquid waste in said SBR, and the settling cycles allowing solids in said waste liquid to at least partially settle;
   vii) transferring a portion of liquid from the bottom part of said SBR during its settling cycle to at least one of said two ASBR;
   viii) transferring a portion of liquid from the top part of said SBR during its settling cycle to a safe water vessel; and
   ix) transferring a portion of settled liquid waste from at least one of said two anaerobic reactors during their settling cycle to a discharge basin;
   wherein said transferring steps are managed by transferring means comprising conduits, valves, pumps, sensors, and a processor, said processor configured to receive signals from said sensors and to send signals to start or stop said stirring, start or stop pumps, and open or close valves.

8. The process of claim 7, wherein in step ii) feedstock is diluted with recycled water from the safe water vessel.

9. The process of claim 7, wherein in step ii) feedstock is diluted with recycled milking wastewater from a dairy farm milking parlor and holding areas.

10. The process of claim 7, wherein the liquid waste from said discharge basin is dried or undergoes Aerated Static Pile (ASP) with an air blower for obtaining soil amendment.

11. The process of claim 7, further comprising mixing the liquid waste in said discharge basin with cellulose or woodchips.

12. The process of claim 7, wherein said steps iii), v), and viii) of transferring are performed in 2 to 6 batches per day.

13. The process of claim 7, wherein said waste originates from pig farms, cattle farms, dairy farms, or chicken farms.

* * * * *